US011496999B2

(12) United States Patent
Yang

(10) Patent No.: US 11,496,999 B2
(45) Date of Patent: Nov. 8, 2022

(54) TRANSMISSION RESOURCE SELECTION METHOD, NETWORK APPARATUS, AND USER EQUIPMENT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/466,608

(22) Filed: Sep. 3, 2021

(65) Prior Publication Data
US 2021/0400643 A1 Dec. 23, 2021

Related U.S. Application Data

(63) Continuation of application No. PCT/CN2019/098043, filed on Jul. 26, 2019.

(51) Int. Cl.
*H04W 72/04* (2009.01)
*H04W 28/04* (2009.01)

(52) U.S. Cl.
CPC .......... *H04W 72/04* (2013.01); *H04W 28/04* (2013.01)

(58) Field of Classification Search
CPC .............................. H04W 72/04; H04W 28/04
See application file for complete search history.

(56) References Cited

U.S. PATENT DOCUMENTS

| 2018/0376457 | A1* | 12/2018 | Tseng | H04W 72/02 |
| 2019/0012296 | A1* | 1/2019 | Hsieh | G06F 7/5443 |
| 2019/0215719 | A1 | 7/2019 | Wei et al. | |
| 2020/0186292 | A1* | 6/2020 | Zou | H04W 76/15 |
| 2020/0314805 | A1* | 10/2020 | Tseng | H04W 76/12 |
| 2021/0126746 | A1* | 4/2021 | Li | H04L 1/1858 |
| 2021/0242974 | A1* | 8/2021 | Fujishiro | H04W 72/04 |
| 2021/0243656 | A1* | 8/2021 | Paterson | H04W 36/08 |

(Continued)

FOREIGN PATENT DOCUMENTS

| CN | 108401484 A | 8/2018 |
| CN | 109150425 A | 1/2019 |
| CN | 109428694 A | 3/2019 |

OTHER PUBLICATIONS

International Search Report in the international application No. PCT/CN2019/098043, dated Apr. 16, 2020.

(Continued)

*Primary Examiner* — Brian D Nguyen
(74) *Attorney, Agent, or Firm* — Perkins Coie LLP

(57) ABSTRACT

A transmission resource selection method, a terminal apparatus, a network apparatus, a chip, a computer readable storage medium, a computer program product, and a computer program are provided. The method includes: sending a duplication-transmission configuration to a UE unit, wherein the UE unit determines whether to perform duplication and/or transmission or not and determines transmission resources to be used to transmit and/or duplicate data according to the duplication-transmission configuration, and the duplication-transmission involves transmitting duplicated data by means of at least two transmission resources.

12 Claims, 17 Drawing Sheets

(56) References Cited

U.S. PATENT DOCUMENTS

2021/0266980 A1* 8/2021 Kim .................. H04W 74/0833
2021/0314969 A1* 10/2021 Gao .................. H04W 72/1205

OTHER PUBLICATIONS

3GPP TSG RAN Meeting #83 RP-190728, Shenzhen, China, Mar. 18-21, 2019, Source: Nokia, Nokia Shanghai Bell; Title: New WID: Support of NR Industrial Internet of Things (IoT).

3GPP TS 38.300 V16.3 0 (Sep. 2020), 3rd Generation Partnership Project; Technical Specification Group Radio Access Network; NR; NR and NG-RAN Overall Description; Stage 2 (Release 16).

3GPP TS 38.331 V16.2 0 (Sep. 2020), 3rd Generation Partnership Project; Technical Specification Group Radio Access Network; NR; Radio Resource Control (RRC) protocol specification (Release 16).

CMCC: "Mechanism of PDCP duplication with multiple RLC entities", 3GPP DRAFT; R2-1905916, 3rd Generation Partnership Project (3GPP), vol. RAN WG2, No. Reno, Nevada, USA; May 13, 2019, XP051729409. 6 pages.

Ericsson: "MAC CE format design", 3GPP Draft; R2-1906856, 3rd Generation Partnership Project (3GPP), vol. RAN WG2, No. Reno, US; May 2, 2019, XP051711155. 2 pages.

Ericsson: "PDCP duplication scenarios and dynamic PDCP duplication parameters", 3GPP DRAFT; R2-1904060, 3rd Generation Partnership Project (3GPP), vol. RAN WG2, No. Xi' an, China; Mar. 28, 2019, XP051693292. 5 pages.

Samsung: "MAC CE for Activation/Deactivation of PDCP Duplication", 3GPP Draft; R2-1709029, 3rd Generation Partnership Project (3GPP), vol. RAN WG2, No. Berlin, Germany; Aug. 20, 2017, XP051318822. 2 pages.

Supplementary European Search Report in the European application No. 19940122.5, dated Feb. 7, 2022. 11 pages.

Written Opinion of the International Search Authority in the international application No. PCT/CN2019/098043, dated Apr. 16, 2020. 12 pages with English translation.

First Office Action of the Chinese application No. 202110851678.0, dated Sep. 5, 2022.

* cited by examiner

Receive a duplication configuration transmitted by a network device — 31

FIG. 3

TRANSMISSION RESOURCE SELECTION METHOD, NETWORK APPARATUS, AND USER EQUIPMENT

CROSS-REFERENCE TO RELATED APPLICATIONS

The present disclosure is a U.S. continuation application of International Application No. PCT/CN2019/098043, filed on Jul. 26, 2019. The contents of the International Application No. PCT/CN2019/098043 is incorporated herein by reference in its entirety.

BACKGROUND

In the current solutions for performing duplication, there are usually two RLC entities in the duplication scenario. In addition, when the duplication is activated, it is usually necessary for the UE to request the transmission resource from the network side, and wait for the network device to configure the transmission resource for the UE, such as RLC entities. As a result, there is a problem that the time of waiting authorization resource for activating duplication is too long, and thus the system processing efficiency cannot be ensured.

SUMMARY

The present disclosure relates to the field of information processing technologies, and particularly, to a method for selecting transmission resource, a network device, a user equipment (UE), a chip, a computer readable storage medium, a computer program product, and a computer program.

In order to solve the above technical problems, embodiments of the present disclosure provide a method for selecting transmission resource, a network device, a user equipment (UE), a chip, a computer readable storage medium, a computer program product, and a computer program.

According to a first aspect, a method for selecting transmission resource is provided. The method is applied to a network device, and the method includes the following operations.

A duplication configuration is transmitted to a user equipment (UE).

The duplication configuration is used for determining, by the UE, whether to perform duplication, and is used for at least one transmission resource, which is used when transmitting data and/or duplicating data, configured for the UE.

According to a second aspect, a method for selecting transmission resource is provided. The method is applied to a UE and the method includes the following operations.

A duplication configuration transmitted by a network device is received.

The duplication configuration is used for determining, by the UE, whether to perform duplication, and is used for at least one transmission resource, which is used when transmitting data and/or duplicating data, configured for the UE.

In a third aspect, a network device is provided. The network device comprises a first communication unit.

The first communication unit is configured to transmit a duplication configuration to a user equipment (UE).

The duplication configuration is used for determining, by the UE, whether to perform duplication, and is used for at least one transmission resource, which is used when transmitting data and/or duplicating data, configured for the UE.

According to a fourth aspect, a user equipment (UE) is provided. The UE includes a second communication unit.

The second communication unit is configured to receive a duplication configuration transmitted by a network device.

The duplication configuration is used for determining, by the UE, whether to perform duplication, and is used for at least one transmission resource, which is used when transmitting data and/or duplicating data, configured for the UE.

In a fifth aspect, a network device including a processor and a memory is provided The memory is configured to store computer programs, and the processor is configured to call and run the computer programs stored in the memory to perform the method of the first aspect or various implementations thereof.

In a sixth aspect, a UE including a processor and a memory is provided. The memory is configured to store computer programs, and the processor is configured to call and run the computer programs stored in the memory to perform the method of the second aspect or various implementations thereof.

According to a seventh aspect, a chip is provided for implementing the method in each of the above implementations.

In particular, the chip includes a processor for calling and running computer programs from a memory to cause a device on which the chip is mounted perform the method according to any one of the first aspect and the second aspect described above or the implementations thereof.

In an eighth aspect, a computer readable storage medium is provided. The computer readable storage medium is used for storing computer programs to cause a computer to perform the method of any one of the first aspect and the second aspect described above or implementations thereof.

In a ninth aspect, a computer program product is provided. The computer program product includes computer program instructions to cause a computer to perform the method of any one of the first aspect and the second aspect described above or implementations thereof.

In a tenth aspect, a computer program is provided. When the computer program run on a computer, the computer performs the method of any one of the first aspect and the second aspect described above or implementations thereof.

BRIEF DESCRIPTION OF THE DRAWINGS

FIG. 3 is a second flow schematic diagram of a method for selecting transmission resource according to embodiment s of the present disclosure.

DETAILED DESCRIPTION

By using the solutions in the disclosure, when two or more transmission resources exist, transmission resources for duplication may be directly configured for the UE, thereby reducing overhead caused by idle mode signaling. The data transmission latency is reduced, the system processing efficiency is ensured and a flexible control manner for data duplication is introduced.

In order to understand the features and technical contents of the embodiments of the present disclosure in more detail, the implementation of the embodiments of the present disclosure will be described in detail with reference to the accompanying drawings, which are provided for the purposes of illustration only and are not intended to limit the embodiments of the present disclosure.

The technical solutions in the embodiments of the present disclosure will be described with reference to the accompanying drawings of the embodiments of the present disclosure. It will be apparent that the described embodiments are part of, but not all, embodiments of the present disclosure. Based on the embodiments in the present disclosure, all other embodiments obtained by a person of ordinary skill in the art without creative work fall within the scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, an LTE Time Division Duplex (TDD), a Universal Mobile Telecommunication System (UMTS), a Worldwide Interoperability for Microwave Access (WiMAX) communication system, or a 5G system.

Figure 1:
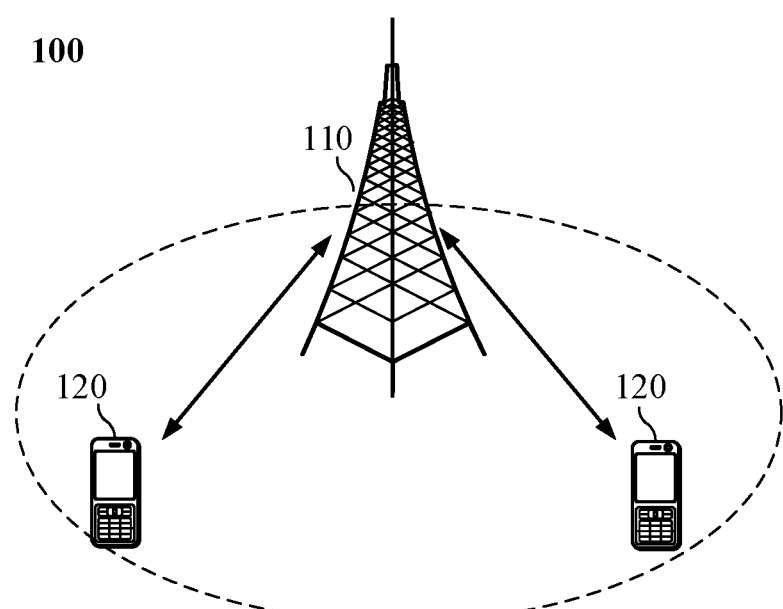
FIG. 1 is a first schematic diagram of a communication system architecture according to embodiments of the present disclosure.
Figure 2:
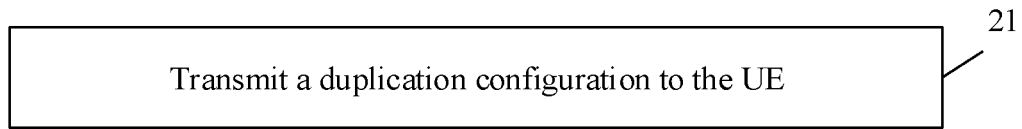
FIG. 2 is a first flow schematic diagram of a method for selecting transmission resource according to embodiments of the present disclosure.

Illustratively, a communication system 100 applied in the embodiments of the present disclosure may be shown in FIG. 1-2. The communication system 100 may include a network device 110, which may be a device that communicates with a UE 120 (or referred to as a communication terminal or a terminal). The network device 110 may provide communication coverage for a particular geographic area and may communicate with UEs located within the coverage area. Alternatively, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a Public Land Mobile Network (PLMN), or the like.

The communication system 100 also includes at least one UE 120 located within coverage of the network device 110. As used herein, "UE" includes, but is not limited to, connections via wired lines, such as connection via a Public Switched Telephone Networks (PSTN), a Digital Subscriber Line (DSL), a digital cable, a direct cable connection, and/or another data connection/network and/or via a wireless interface, e.g., for cellular networks, Wireless Local Area Network (WLAN), digital television networks such as DVB-H networks, satellite networks, AM-FM broadcast transmitters, and/or apparatus, configured to receive/transmit communication signals, of another terminal device, and/or Internet of Things (IoT) devices. A UE configured to communicate through a wireless interface may be referred to as a "wireless communication terminal", "wireless terminal" or "mobile terminal".

Alternatively, Device to Device (D2D) communication may be performed between the UEs 120.

It should be understood that the terms "system" and "network" are used interchangeably herein. The term "and/or," as used herein, is merely an association that describes an associated object, meaning that there may be three relationships, e.g., A and/or B may represent three conditions: i.e., independent existence of A, existence of both A and B, and independent existence of B. In addition, the character "/" generally indicates that relationship between the associated objects is "or".

In order to understand the features and technical contents of the embodiments of the present disclosure in more detail, the implementation of the embodiments of the present disclosure will be described in detail with reference to the accompanying drawings, which are provided for the purposes of illustration only and are not intended to limit the embodiments of the present disclosure.

The embodiments of the present disclosure provide a method for selecting transmission resource. The method is applied to a network device, as shown in FIG. 2, the method includes the following operations.

In operation 21, a duplication configuration is transmitted to the UE. The duplication configuration is used for determining, by the UE, whether to perform duplication, and is used for at least one transmission resource, which is used when transmitting data and/or duplicating data.

Accordingly, the embodiments of the present disclosure further provide a method for selecting transmission resource. The method is applied to a UE, as shown in FIG. 3, the method includes the following operations.

In operation 31, a duplication configuration transmitted by a network device is received. The duplication configuration is used for determining, by the UE, whether to perform duplication, and is used for at least one transmission resource, which is used when transmitting data and/or duplicating data.

The duplication is transmission of duplicated data containing at least two transmission resources. The embodiments are particularly suitable for transmission of duplicated data containing three or more transmission resources.

The duplication configuration includes an index of at least one transmission resource used for transmitting data and/or duplicating data.

The above transmitted data is understood to be the original data, and the duplicated data may be understood to be a data copy or a copy. That is, the duplication includes one piece of transmission data and one or more duplicated data. Alternatively, when the duplication state is activated, the transmitted data may also be used as the duplicated data. That is, the transmitted data (i.e., the original data) is used as one of the duplicated data. In this way, the duplication includes two or more duplicated data. The scenario for which the present embodiments are directed may be a duplication including three or more duplicated data.

The at least one transmission resource used for transmitting data and/or duplicating data include at least one of the following: a radio link control (RLC) entity used for transmitting data and/or duplicating data, a logical channel used for transmitting data and/or duplicating data, a CG used for transmitting data and/or duplicating data, and a carrier used for transmitting data and/or duplicating data.

Figure 4:
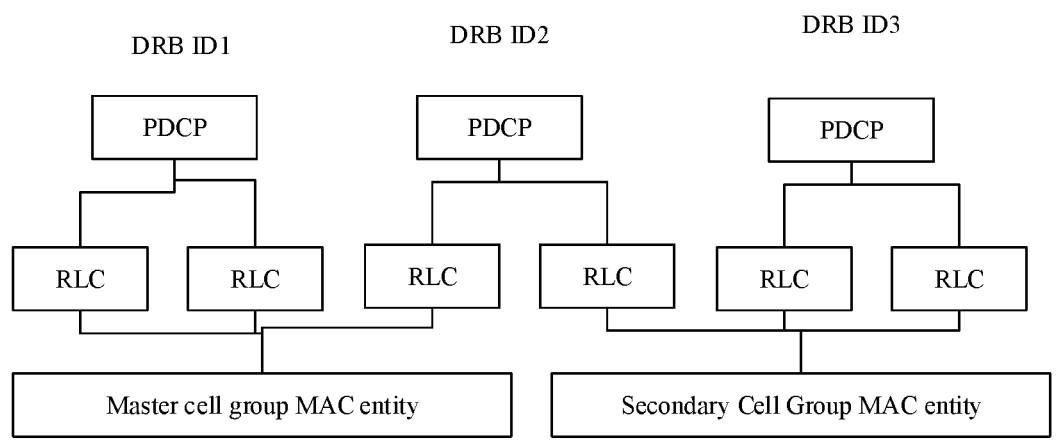
FIG. 4 is a schematic diagram of a CA and DC transmission architecture.

The transmission of services, such as industrial automation, transmission automation, intelligent power, etc., in the 5G system is required to be supported in 5G IIoT. The IIoT introduces the concept of a time sensitive network (TSN) network or TSC based on its latency and transmission requirements for reliability. In order to provide a high-reliability and low-latency transmission effect for its services, research directions of data duplication and multi-connectivity are introduced, and NR IIoT WID (RP-190728) determines a duplication architecture containing a combination of Dual connectivity (DC) and Carrier aggregation (CA), thereby further improving reliability. With respect to the duplication, as shown in FIG. 4, the data duplication is performed at the PDCP layer, and the same PDCP PDUs are respectively mapped to different RLC entities. Data duplication is also PDCP duplication. The MAC needs to transmit the duplicated data of different RLC entities to different carriers. In this way, the corresponding number of RLC entities may be at least one the following: 1, 2, 3 and 4, etc.

For the CA scenario, the solution supporting data duplication utilizes the duplication data function of PDCP to enable the duplicated PDCP PDU to be transmitted to two RLC entities (two different logical channels) respectively, and finally ensures that the duplicated PDCP PDU can be transmitted by different physical layer aggregation carriers, thereby achieving a frequency diversity gain to improve data transmission reliability, as shown in DRB ID1 and DRB ID3 of FIG. 4.

For the DC scenario, the solution supporting data duplication utilizes the duplication data function of PDCP to enable the duplicated PDCP PDU to be transmitted to two RLC entities respectively. The two RLC entities correspond to different MAC entities respectively, as shown in DRB ID 2 of FIG. 4.

The present embodiments are described in a plurality of processing manners in the following.

Processing Manner 1.

The processing manner is a copying (duplication) solution mainly determined by a network device. The network notifies, through DCI or MAC CE or RRC, the index of the at least one transmission resource used in the duplication (e.g., which may include at least one of the following: a RLC entity, a logical channel index, a carrier index, and a CG index). Accordingly, the UE determines, based on the information, whether to perform duplication, and CG resource used on the corresponding carrier when transmitting data and/or duplicating data.

Figure 5:
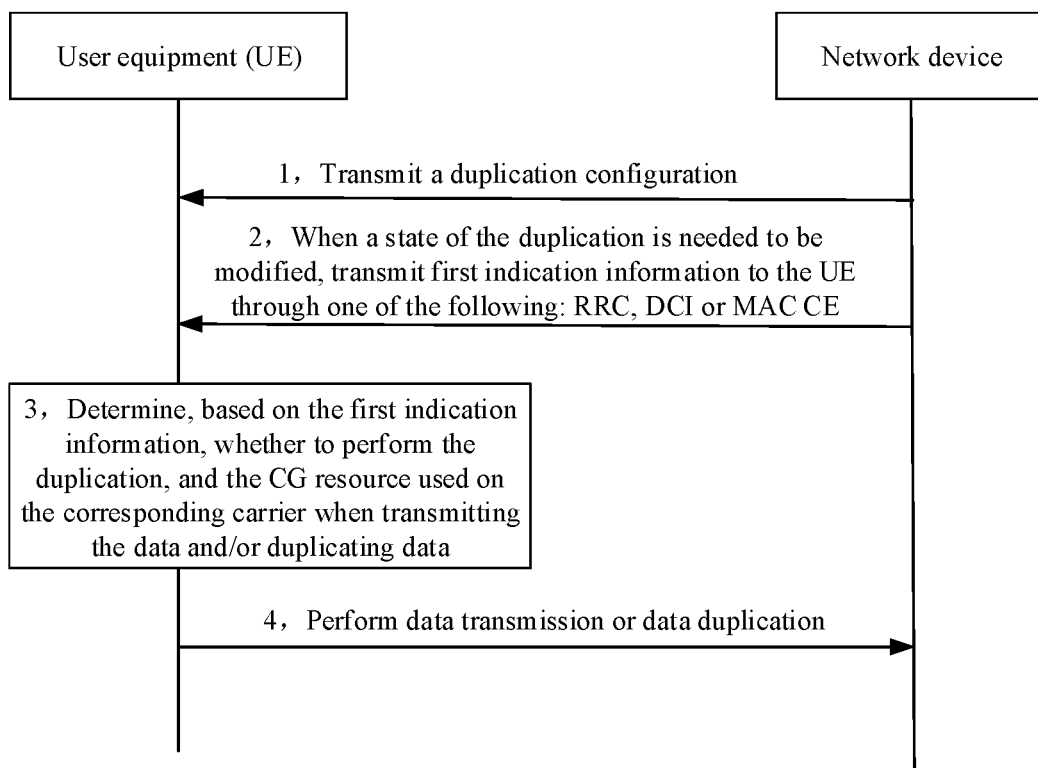
FIG. 5 is a schematic diagram of a processing manner of a flow for selecting transmission resource according to embodiments of the present disclosure.

The present processing manner is described with reference to FIG. 5.

Firstly, the network device transmits a duplication configuration to the UE.

The duplication configuration includes at least an index of at least one transmission resource used for duplication.

In addition, the duplication configuration further includes at least one of the following: an initial state of a duplication mode, a number of pieces of duplicated data corresponding to the initial state, a primary cell of a cell group corresponding to a bearer for performing duplication configured for the UE, and a primary cell corresponding to the bearer for performing duplication configured for the UE.

The initial state of the duplication may include activating the duplication or deactivating the duplication. Here, the duplication may be understood as a function of copying or a function of copying and transmission. The number of pieces of duplicated data corresponding to the initial state may be set according to actual condition. For example, the number of pieces of duplicated data corresponding to the initial state may be two or more, or one.

The two pieces of information: a primary cell of a cell group corresponding to a bearer for performing duplication configured for the UE, and a primary cell corresponding to the bearer for performing duplication configured for the UE, may exist at the same time or only one of them may exist. If the two pieces of information exist at the same time, it may be understood that the two indications are partially different. The bearer may correspond to the master cell group or the secondary cell group. The primary cell corresponding to the bearer for performing duplication configured for the UE may be considered as a primary cell including the master cell group and/or the secondary cell group. The primary cell of cell group corresponding to the bearer may correspond to only one of them, such as merely containing the primary cell of the master cell group or the primary cell of the secondary cell group. The two pieces of information may also not exist at the same time. For example, when the above primary cell corresponding to the bearer is not configured, the primary cell of the master cell group (MCG) may be considered as the primary cell corresponding to the bearer, and/or the primary cell of the secondary cell group (SCG) may be considered as the primary cell corresponding to the bearer.

Here, the primary cell may be understood as a specific RLC entity or logical channel configured by the CG or bearer. At this time, the primary cell may be understood as the primary leg/RLC entity/logical channel, and the primary cell may be at least used for transmitting PDCP control PDU.

In addition, the primary cell may also be understood as a particular carrier configured for the CG or the bearer. Specifically, the primary cell may be understood as the primary carrier. For example, data of a bearer configuring duplication when the duplication is deactivated may be transmitted through a primary carrier (i.e., the above primary cell). Alternatively, the data of the bearer configuring duplication when the duplication is deactivated may be transmitted at least through the primary carrier (i.e., the primary cell). Alternatively, the above data may further include a PDCP control PDU, or the data may further include a PDCP data PDU.

Further, the duplication configuration further includes at least one of the following.

A primary leg or a logical channel when a duplication mode of the bearer for performing duplication configured for the UE is in an activation state. The primary leg or logical channel may be used to transmit PDCP control PDU, and/or a PDCP data PDU.

A default leg, a primary leg or a logical channel when the duplication mode of the bearer for performing duplication configured for the UE is in a deactivation state. The default leg, the primary leg or the logical channel may be represented by a default index, or a primary leg index or a logical channel index, and the default leg, the primary leg or the logical channel may be used to transmit PDCP control PDU and/or PDCP data PDU.

A default carrier when the duplication mode of the bearer for performing duplication configured for the UE is in the deactivation state.

A Configured Grant (CG) when the duplication mode of the bearer for performing duplication configured for the UE is in the deactivation state.

It should be understood that the above default carrier may be a default carrier list. That is, at least one default carrier may be configured for the UE in the duplication configuration, and the carrier list is formed by the at least one default carrier. The carrier may be represented by a carrier index, and the carrier list includes an index of at least one default carrier.

The default CG in the duplication configuration may be a single CG or may be a CG group, or may be multiple CGs (the multiple CGs may be multiple CGs in different CG groups, or may be multiple CGs in the same CG group, or may be multiple CGs without grouping). That is, the default CG may be represented by indexes or identifiers of one or more CGs, or may be represented by indexes or identifiers of one or more CG groups. The transmitted duplication configuration may be expressed as a CG list. The CG list contains indexes of one or more CG groups, or indexes of one or more CGs.

Secondly, if a state of the duplication is needed to be modified, first indication information is transmitted to the UE through one of the following: RRC, DCI or MAC CE.

The first indication information carries at least one of the following information: a bearer index used for transmitting data and/or duplicating data after modifying the duplication state, an RLC entity index used for transmitting data and/or duplicating data after modifying the duplication state, a logical channel index used for transmitting data and/or duplicating data after modifying the duplication state, a cell group index used for transmitting data and/or duplicating data after modifying the duplication state, a carrier index used for transmitting data and/or duplicating data after modifying the duplication state, and a CG index used for transmitting data and/or duplicating data after modifying the duplication state.

That is, if the network device determines that the state of the duplication is needed to be modified, for example, the state of the duplication is needed to be modified from activation state to a deactivation state, or the leg/RLC entity that performs the transmission of duplicated data is needed to be modified, the information may be notified by the network device to UE through the DCI, the MAC CE, or the DCI.

Both the carrier index and the CG index used for transmitting data and/or duplicating data after modifying the duplication state in the first indication information may form the corresponding lists.

At least one of the above CG index, the carrier index, the RLC entity index, the logical channel index, and the cell group index may be lists, for example, a carrier index list. Alternatively, the CG index, carrier index, RLC entity index, logical channel index, cell group index may also be represented in the form of a combination of bitmap indexes, for example, a carrier is identified by a bitmap index, or a CG is identified by a bitmap index or the like.

In addition, the operation that the network device determines that the state of the duplication is needed to be modified may be that, the network device determines whether the state of the duplication is needed to be modified according to factors such as a current data transmission amount, a packet loss rate, channel quality, and a packet type to be transmitted. For example, if the duplication is currently in the deactivation state and a high packet loss rate or a poor channel quality is detected, the duplication may be controlled to switch from the deactivation state to the activation state, thereby ensuring the quality of the data transmission. On the contrary, if the duplication is currently in the activation state and a good channel quality is detected currently, the duplication may be controlled to switch to the deactivation state. Since one transmission resource may guarantee the quality of the data transmission, the effective utilization rate of the resource is improved. Of course, other factors may be provided to determine whether the state of the duplication is needed to be modified, but the present embodiments will not be exhaustive.

Figure 6:
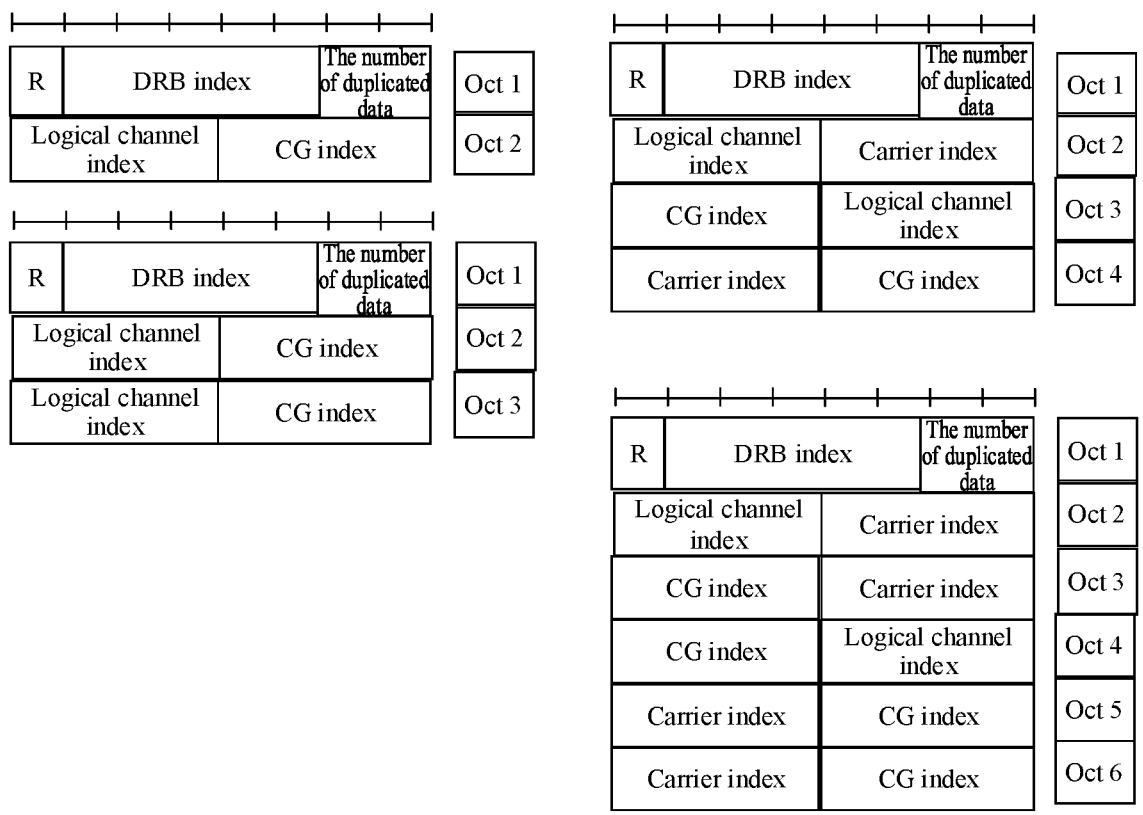
FIG. 6 is a schematic diagram of formats of various MAC CE according to embodiments of the present disclosure.

Specifically, an example of an MAC CE is shown in FIG. 6.

A new LCID is introduced to identify the activation/deactivation of duplication in at least two leg scenarios.

A new MAC CE format is introduced. The format may include at least one of the following information: bearer index, RLC entity index/logical channel index, cell group index, carrier index, and CG index. For example, the RLC entity index/logical channel index is an implicit RLC entity index/logical channel index, which may occupy, for example, 4 bit, and the RLC entities configured for this bearer are sorted in ascending order of index. As shown in the top left of FIG. 6, a DRB bearer may be considered to contain a logical channel index. When the index is 0001, the duplication of logical channel may be considered to be activated, and if the index is 0000, the duplication of logical channel may be considered to be deactivated. In the lower left of FIG. 6, it can be seen that the DRB bearer corresponds to two logical channels and two logical channels are arranged in ascending order in MAC CE. The index 0001 represents that the duplication of the first logical channel is activated, and the index 0010 represents that the duplication of the second logical channel is activated.

For another example, the RLC entity index/logical channel index is an implicit RLC entity index/logical channel index, such as a combined indication of use or non-use of the RLC entity/logical channel. For example, the index occupies 4 bit. If there are four RLC entities or logical channels, and the RLC entities configured for this bearer are sorted in ascending order of index, the index 0001 represents that the RLC entity with minimum RLC index is activated. The index 0010 represents that the second-ranked RLC entity is activated. The index 0100 represents that the third-ranked RLC entity is activated. The index 1000 represents that the fourth-ranked RLC entity is activated (the RLC entity/logical channel with maximum index). The index 0110 represents that the second-ranked RLC entity and the third-ranked RLC entity are activated.

For another example, the RLC entity index/logical channel index is an explicit RLC entity index/logical channel index. Specifically, which logical channel is indicated to be activated or used, the index of the corresponding logical channel is carried in the MAC CE.

Figure 7:
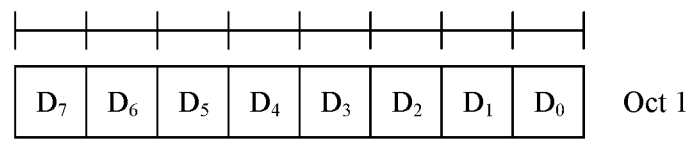
FIG. 7 is a schematic diagram of formats of various MAC CE according to embodiments of the present disclosure.

In the above descriptions, a manner for indicating the activation based on the format of new MAC CE is mainly described. Deactivation may be indicated by setting the index corresponding to the RLC entity or logical channel to be 0. For example, one certain bit is 0 indicates that the corresponding logical channel is a deactivated logical channel. When the value is 0000, it represents that all corresponding logical channels or duplication is deactivated. Alternatively, when only one bit is 1, such as 0001, it represents that only the corresponding logical channel is used for transmitting data or duplication is deactivated. Alternatively, the indication of deactivation or activation may be performed by adopting a format of an existing MAC CE. For example, as shown in FIG. 7, Di indicates that the i-th DRB PDCP duplication is activated or deactivated. For example, when the corresponding indication is that Di is set to 1, activation (or deactivation) may be indicated, and deactivation (or activation) may be indicated when Di is set to 0. The DRB is arranged in ascending order, and is a DRB configured on this MAC entity by a configured logical channel.

It should be noted that in the MAC CE, it may carry a carrier index and/or CG index, or a carrier index list and/or a CG index list, which will not be exemplified here.

Figure 8:
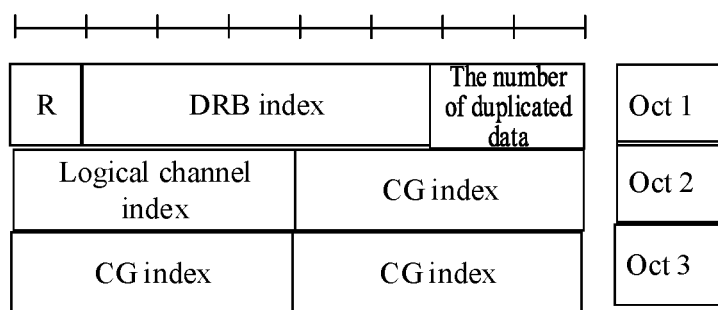
FIG. 8 is a schematic diagram of formats of various MAC CE according to embodiments of the present disclosure.

Another example of the MAC CE format is shown in FIG. 8, a plurality of CGs are indicated in MAC CE. As shown in the figure, three CGs are contained, and the index of each CG is indicated in MAC CE respectively. Regarding the activation or deactivation for different CGs, it may be same with the above indication manner for the RLC entity/logical channel, which is an explicit CG index (e.g., 0001 represents the use of CG index1, 0010 represents the use of CG index2, and 0011 represents the use of CG index3). Referring with FIG. 8, if CG index1 and CG index2 are activated, the bit field of the first CG index is 0001, and the bit field of the second CG index is written as 0010. The bit field of the third CG index is 0000. Alternatively, if the third CG is not activated, only the first two CG indexes may be contained in FIG. 8.

Alternatively, index of CG combination may be adopted (e.g. 0001 represents the use of CG idnex1, 0010 represents the use of CG index2 and 0011 represents the uses of CG index2 and CG index 1).

In addition, for the carrier index, the same manner as the RLC entity may be adopted. For example, an explicit carrier index (e.g., 0001 represents the use of the carrier index1, 0010 represents the use of the carrier index2, and 0011 represents the use of the carrier index3) or index of CG combination (e.g., 0001 represents the use of the carrier idnex1, 0010 represents the use of the carrier index2, and 0011 represents the use of the carrier index2 and carrier index1) may be adopted.

It should be noted that the length of MAC CE may be variable or fixed. It should be noted that the MAC CE mentioned in the present processing manner may be applied to each processing manner in the present embodiments, and details are not described below.

Thirdly, the UE receives the first indication information transmitted by the network device through one of RRC, DCI or MAC CE. Then, the UE determines, based on the first indication information, whether to perform the duplication, and the CG resource used on the corresponding carrier when transmitting the data and/or duplicating data.

The specific content of the first indication information is as described above, and details are not described herein.

Specifically, the UE performs at least one of the following operations.

A bearer, such as a DRB, on which the modification of duplication is performed, is determined based on the bearer index used for transmitting data and/or duplicating data after modifying the duplication state in the first indication information.

The UE determines, based on the RLC entity index used for transmitting data and/or duplicating data after modifying the duplication state and/or the cell group index used for transmitting data and/or duplicating data after modifying the duplication state, the leg used for transmitting data and/or duplicating data, such as which RLC entity.

The UE determines, based on the CG index and/or carrier index used for transmitting data and/or duplicating data after modifying the duplication state, the UL grant used for transmitting data and/or duplicating data, such as the configured CG and/or which carrier is used for data transmission. If CG index1 is indicated, it represents that the CG resource is activated or is used for transmitting the bearer.

Fourthly, the UE performs data transmission or data duplication according to network instructions.

In the prior art, when a network indicates the modification of duplication state, such as from deactivation to activation, and if the corresponding grant resource information by using is not indicated, a UE needs to transmit an SR to request uplink resource when transmitting the UL data, and then transmits the UL data, which causes a large transmission latency. For a service supporting latency sensitivity in R16, such a large transmission latency cannot ensure QoS of the service, which may cause a service transmission problem, affect UE experience, and even lead to a major error in industrial production. Therefore, transmission resource to be used may be transmitted to the UE as soon as possible by using the above processing manner, thereby improving processing efficiency.

Processing Manner 2.

The network notifies the number of copies of the duplication through the DCI or the MAC CE, and the UE determines whether to perform the duplication according to the acquired number of copies, and selects the transmission resource carrying the duplication data.

Figure 9:
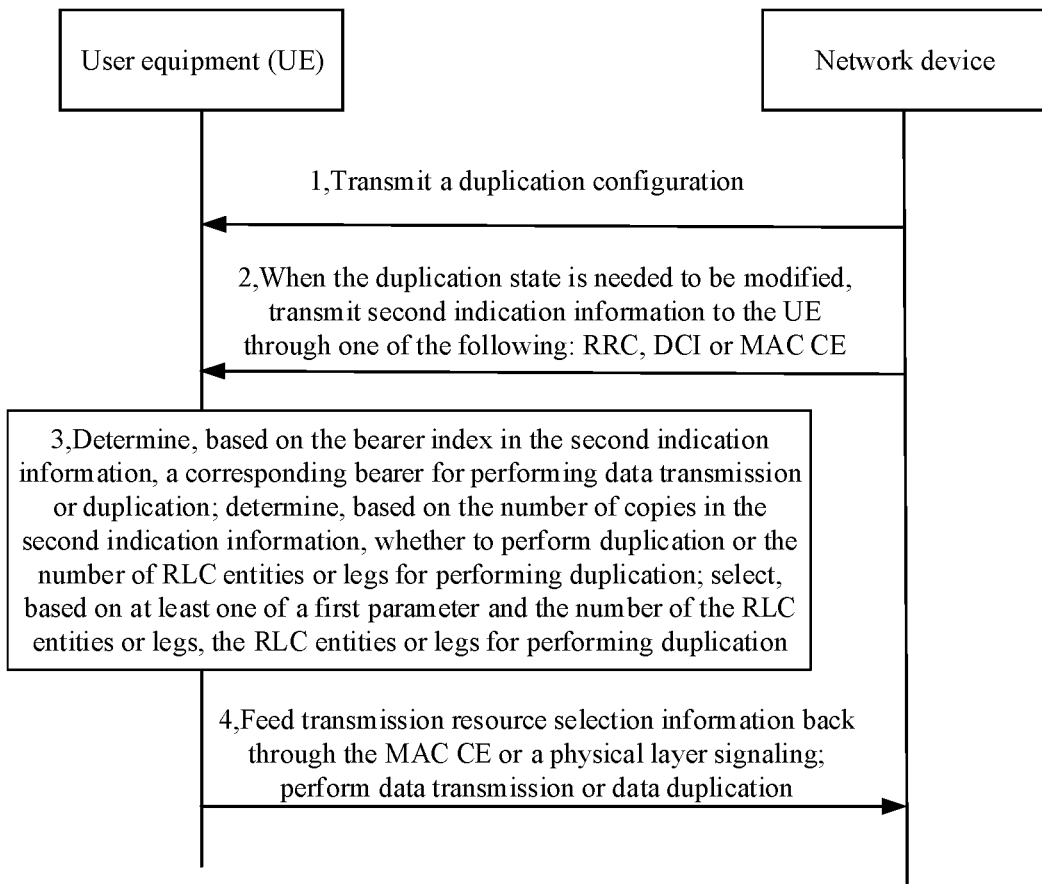
FIG. 9 is another schematic diagram of a processing manner of a flow for selecting transmission resource according to embodiments of the present disclosure.

The following is described referring with FIG. 9.

Firstly, the network transmits a duplication configuration for the UE. Specifically, the processing manner is same as that described above, and details are not described herein.

Secondly, if the duplication state is needed to be modified, second indication information is transmitted to the UE through one of RRC, DCI or MAC CE. The second indication information is used for indicating a bearer that the UE needs to modify and a number of pieces of duplicated data corresponding to the bearer.

That is, when the network determines that the duplication state is needed to be modified, for example, the number of copies of the transmission of duplicated data is modified, or the number of leg/RLC entities that perform the transmission of pieces of duplicated data is modified, the information is notified by the network to the UE through DCI or MAC CE. The DCI or MAC CE may carry a corresponding bearer index and the number of pieces of duplicated data (copies).

Figure 10:
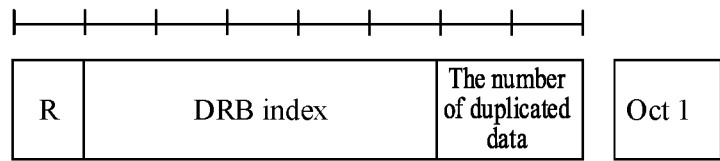
FIG. 10 is a schematic diagram of a format of another MAC CE according to embodiments of the present disclosure.

Specifically, an example of MAC CE is shown in FIG. 10.

A new LCID is introduced to identify the activation/deactivation of duplication in at least two leg scenarios.

A new MAC CE format is introduced. The format may include at least one of the following information: bearer index (DRB Index in the figure) and the number of copies. For example, copies occupy 4 bit. For example, 00 represents 1 copy, 01 represents 2 copies, 10 represents 3 copies, and 11 represents 4 copies.

Thirdly, the UE receives the second indication information transmitted by the network device through one of RRC, DCI or MAC CE. Then, the UE determines, based on the bearer index in the second indication information, a corresponding bearer for performing data transmission or duplication. The UE determines, based on the number of duplications in the second indication information, whether to perform duplication or the number of RLC entities or legs for performing duplication. The UE selects, based on at least one of a first parameter and the number of the RLC entities or legs, the RLC entities or legs for performing duplication.

Specifically, the UE determines, based on the bearer index that the duplication state is needed to be modified, the bearer, such as a DRB, on which the modification of duplication is performed.

The UE determines, based on the number of copies, whether to perform duplication and the number of RLCs or legs for performing duplication. If the number of copies is 1, it represents that the duplication is not to be performed, and then the UE performs transmission by using anyone leg or primary leg. If the number of copies is 2, it represents that the duplication is to be performed, and then the UE performs transmission by using two legs or RLC entities. If the number of copies is 3, it represents that the duplication is to be performed, and then the UE performs transmission by using three legs or RLC entities.

After determining the number of copies or the number of legs, the UE determines which leg is selected. That is, the UE determines the leg that performs the duplication. There may be two processing manners. In one manner, after determining the number N of copies or the number N of legs (N being an integer), the UE randomly select N legs from a plurality of legs as the legs for performing the duplication.

In another manner, after determining the number of copies or the number of legs, the UE may determine which leg is selected based on the first parameter. That is, the UE determines the leg for performing the duplication. Specifically, the leg for performing the duplication may be selected from a plurality of legs according to the first parameter, or the first parameter and its corresponding comparison threshold.

The first parameter is at least one of the following: channel quality, the number of NACKs in HARQ feedback, ARQ feedback, average latency, QoS parameter, and reliability threshold.

The operation of selecting according to the first parameter may be selecting based on the first parameter and its corresponding comparison threshold. The first parameter and/or the comparison threshold may be indicated to the UE by the network, or may be pre-configured by the UE.

For example, when the RSRP of the Cell1 is higher than the threshold, the UE selects the cell or the RLC entity corresponding to the cell to transmit the duplicated data. If the number of NACKs in the HARQ feedback of the Cell1 is not higher than a value of the preset number threshold, the cell or the RLC entity corresponding to the cell may be selected to transmit the duplication data. In addition, the frequency at which the NACK is received may be further obtained according to the number of NACKs in the HARQ feedback. If the frequency is not higher than the preset frequency threshold value, the cell or the RLC entity corresponding to the cell may be selected to transmit the duplicated data. In addition, the corresponding thresholds may be set for the ARQ feedback, the average latency, the Qos parameter, and the reliability, so that the selection is performed with a manner similar to that described above. Details are not described herein.

Alternatively, if the carrier corresponding to the leg is an unlicensed carrier, the UE may descend the priority for selecting the carrier or RLC entity to transmit the duplicated data.

Then, the UE selects the used CG resource on the selected RLC or leg or carrier. It may be understood that the UE selects the CG resource used when transmitting data according to a plurality of carriers used on the selected RLC entity, and the CG resource may include CG index. Alternatively, It may be understood that the used CG resource may be selected according to a plurality of carriers used in the RLC entity corresponding to the selected leg. Alternatively, It may be understood that the used CG resource is selected from a plurality of carriers. For example, the UE selects a preconfigured resource that the CG index is 1 to transmit the data of the bearer. For example, an RLC entity may transmit by using a plurality of carriers according to LCH-to-cell restriction. The CG index used for transmitting the data on each carrier is then determined for each carrier. Specifically, the CG index used for transmission on each carrier may be the same or different.

In addition, the MAC CE may further carry at least one of the following: the number of RLC entity indexes/logical channels, RLC entity index/logical channel index, and cell group index. The UE does not need to select the RLC entity, and merely selects the CG resource. Alternatively, in the above MAC CE, at least one of the following may be further carried: CG index and carrier index. The UE does not need to select the CG resource, and merely selects the RLC entity. This is not limited herein.

Fourthly, the UE feeds back transmission resource selection information through the MAC CE or physical layer signaling. Further, data transmission or data duplication is performed according to the above descriptions.

The transmission resource selection information includes at least one of the following: a carrier index selected by the UE, an RLC entity index selected by the UE, a logical channel index selected by the UE, a cell group index selected by the UE, and a CG index selected by the UE. Similarly, the CG index may be one or more CG indexes. That is, the CG index may be a CG list. Similarly, the carrier index may be one or more carrier indexes. That is, the carrier index may be a carrier index list.

That is, at least one of the above CG index, carrier index, RLC entity index, logical channel index, and cell group index included in the resource selection information fed back by the UE for the network device may be in a list form. For example, the resource selection information may include a carrier index list.

Alternatively, at least one of the above CG index, the carrier index, the RLC entity index, the logical channel index, and the cell group index included in the resource selection information may also be represented in the form of a combination of bitmap indexes. For example, a carrier is identified by a bitmap, or a CG is identified by a bitmap, or the like.

In another situation, when performing the above first operation or the second operation, or before performing the third operation, the following operation may be further included. Third indication information is transmitted to the UE. The third indication information includes the carrier index and/or the CG index. Specifically, it may be understood that the third indication information includes an index of at least one transmission resource that can be used by the bearer that the duplication state needs to be modified, and specifically may be a CG index.

It should be understood that the index of the at least one transmission resource that can be used by the bearer that the duplication state needs to be modified in the third indication information may further include at least one of the following: carrier index that can be used, RLC entity index that can be used, logical channel index that can be used, and cell group index that can be used. At least one of the CG index that can be used, the carrier index that can be used, the RLC entity index that can be used, the logical channel index that can be used, and the cell group index that can be used may be a list. For example, it may be a list of carrier indexes that can be used. Alternatively, at least one of CG index that can be used, carrier index that can be used, RLC entity index that can be used, logical channel index that can be used, and cell group index that can be used included in the third indication information may also be represented in the form of a combination of bitmap indexes. For example, a carrier that can be used is identified by a bitmap or a CG that can be used is identified by a bitmap, or the like.

The third indication information may also be transmitted by the network device through one of MAC CE, DCI, and RRC. The index of the at least one transmission resource, such as CG index list or CG index, that can be used on a carrier corresponding to each RLC entity is indicated by the third indication information. When it is finally determined to use the corresponding RLC entity to transmit data and/or duplicate data, the UE determines a CG resource that can be used based on the above third indication information. This has advantages that the selection complexity of the UE is avoided, and the main control right is given to the network, so that the UE is controllable for the network.

Since the UE is more aware of the link quality than the network, the network may merely notify the number of copies of the duplication. Since there is a one-to-one correspondence between the number of copies and the number of legs, an active leg or RLC entity may be selected by the UE. In this way, the UE may have higher flexibility, the selected duplication resource may suit the channel situation better, and more appropriate resource may be selected to transmit data effectively. Meanwhile, for a service supporting latency sensitivity in R16, the UE may select CG resource suitable for transmission of the service at the same time, thereby reducing the latency of requesting uplink grant from the network, ensuring QoS of the service, and avoiding causing major errors.

Processing Manner 3.

The UE determines whether to modify the duplication manner, and notifies the corresponding information to the network through the MAC CE or the physical layer information. The information may include at least one of the following: bearer index, RLC entity index/logical channel index, cell group index, carrier index, CG index.

Figure 11:
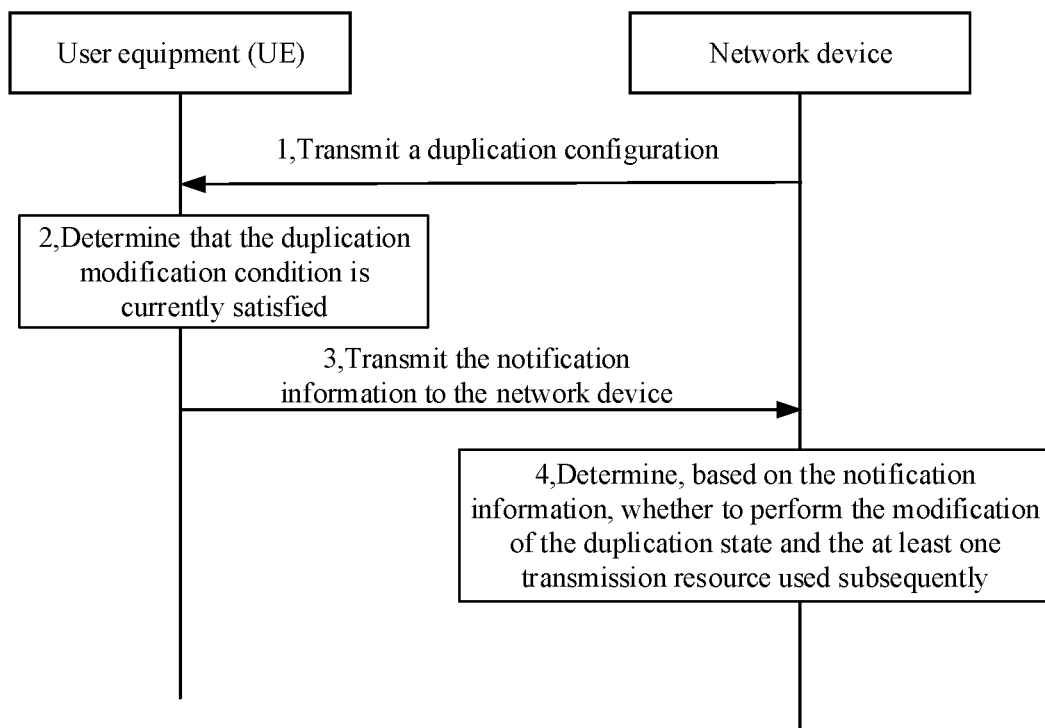
FIG. 11 is another schematic diagram of a processing manner of a flow for selecting transmission resource according to embodiments of the present disclosure.

As shown in FIG. 11. Firstly, the network transmits a duplication configuration for the UE. The specific processing manner is same with the manner described above, and details are not described herein.

In addition, the network device may also configure, through RRC, a decision mechanism for the UE to perform the duplication modification, such as a threshold, a measurement object, and the like.

Secondly, the UE receives configuration information of the network. The data transmission is performed according to the initial state of the duplication. Alternatively, when the initial transmission state is not indicated, the UE may determine the initial transmission state by itself, or determine the initial transmission state according to the mechanism (information) configured by network, or determine the initial transmission state according to a predefined rule. The transmission is performed according to the initial transmission state.

When the UE determines that the duplication modification condition is currently satisfied, for example, when the state of the duplication is modified from an activation state to a deactivation state, or when the leg/RLC entity that performs the transmission of duplicated data is modified, the UE modifies the resources used for the duplication, such as the number of RLC entities, the specific RLC entity, the carrier, and one or more CGs.

The manner in which the UE determines that the duplication modification condition is satisfied is similar to the manner in which the network device determines the modification condition in the processing manner 1, but is used in the UE side for processing. Therefore, details are not described herein.

Thirdly, the notification information is transmitted to the network device. The notification information includes at least one transmission resource used for transmitting data and/or duplicating data after the UE determines to modify a duplication state.

The at least one transmission resource used for transmitting data or duplicating data after modifying the duplication state includes at least one of the following: a bearer index used for performing data transmission or duplication after modifying the duplication state, an RLC entity index used for performing data transmission or duplication after modifying the duplication state, a cell group index used for performing data transmission or duplication after modifying the duplication state, a carrier index used for performing data transmission or duplication after modifying the duplication state, and a CG index used for performing data transmission or duplication after modifying the duplication state.

Specifically, the information may be notified by the UE to the network device through UCI or MAC CE or RRC. The notification information may also include a CG index or a CG group index, that is, one or more CGs, which may be in a form of CG list, may be included in the notification information. For example, the CG list may include indexes of one or more CGs, or may include indexes of one or more CG groups. Similarly, the notification information may also include a carrier index or a carrier group index, that is, one or more carriers, which may be in a form of carrier list, may be in included in the notification information. For example, the carrier list may include indexes of one or more carriers, or may include indexes one or more carrier group.

That is, at least one of the above CG index, carrier index, RLC entity index, logical channel index, and cell group index included in the notification information fed back by the UE to the network device may be in a list form. For example, the resource selection information may include a carrier index list and a CG index list, and the like.

Alternatively, at least one of the CG index, the carrier index, the RLC entity index, the logical channel index, and the cell group index included in the notification information may also be represented in the form of a combination of bitmap indexes. For example, a carrier is identified by a bitmap, or a CG is identified by a bitmap, or the like.

Figure 12:
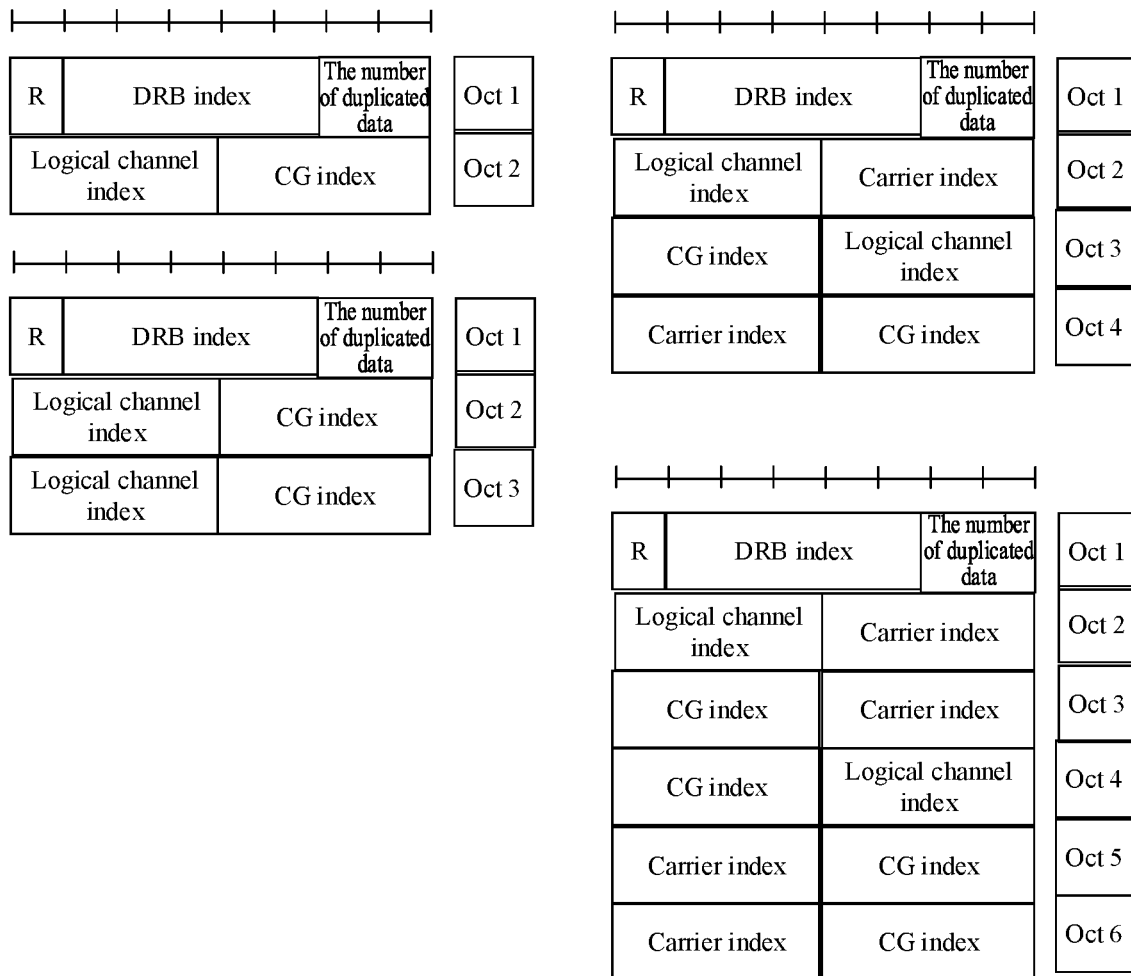
FIG. 12 is another schematic diagram of a format of MAC CE according to embodiments of the present disclosure.

Specifically, the MAC CE for the UE to report the notification information may be as shown in FIG. 12.

A new LCID is introduced to identify the activation/deactivation of duplication in at least two leg scenarios.

A new MAC CE format is introduced. The format may include at least one of the following information: bearer index, RLC entity index, cell group index, carrier index, and CG index.

Fourthly, the network device receives the notification information. The network device determines, based on the notification information, whether to perform the modification of the duplication state and the transmission resource used for transmitting data and/or duplicating data, such as which RLC entity, which carrier, which CG, and the like.

That is, if the cell determines that modification of the duplication state is not performed according to the notification, for example, the activation state is maintained, the transmission resource used for transmitting data and/or duplicating data may be further determined. Alternatively, the deactivation state may be maintained, and the transmission resource used for transmitting data may be further determined. Alternatively, if the state remains unchanged, the transmission resource may not be further determined, but the original transmission resource may be used. If the state is modified, for example, the state is modified to be the activation state, the transmission resource used for transmitting data and/or duplicating data are further determined, and if the state is modified to be the deactivation state, the transmission resource used for transmitting data are further determined.

Since a duplication mechanism based on UE selection may be considered to be supported in the R16, the mechanism in which UE selects duplication may be determined based on rules of network configuration. This has the advantage that the UE may have higher flexibility, channel situation is better reflected, and more appropriate resource are selected to transmit data effectively. Meanwhile, for a service supporting latency sensitivity in R16, the UE may select CG resource suitable for transmission of the service at the same time, thereby reducing the latency of requesting uplink grant from the network, ensuring QoS of the service, and avoiding causing major errors in industrial production.

Therefore, by using the above solutions, when are two or more transmission resources exist, transmission resource for duplication may be directly configured for the UE, thereby reducing overhead of idle mode signaling, reducing data transmission latency, ensuring system processing efficiency and increasing a flexible control manner for data duplication.

Figure 13:
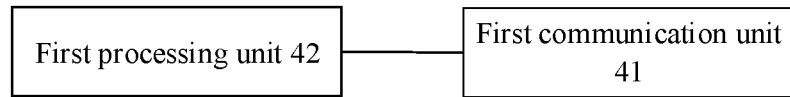
FIG. 13 is a schematic diagram of a composition structure of a network device according to embodiments of the present disclosure.

The embodiments of the present disclosure provide a network device. As shown in FIG. 13, the network device includes a first communication unit 41.

The first communication unit 41 is configured to transmit a duplication configuration to a user equipment (UE). The duplication configuration is used for determining, by the UE, whether to perform duplication, and is used for at least one transmission resource, which is used when transmitting data and/or duplicating data, configured for the UE.

Figure 14:
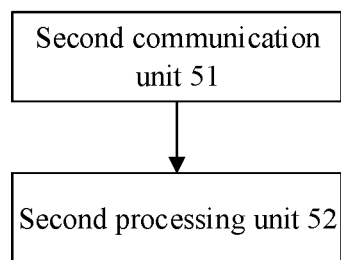
FIG. 14 is a schematic diagram of a composition structure of a UE according to embodiments of the present disclosure.

Accordingly, the embodiments of the present disclosure further provide a UE. As shown in FIG. 14, the UE includes a second communication unit 51.

The second communication unit 51 is configured to receive a duplication configuration transmitted by a network device. The duplication configuration is used for determining, by the UE, whether to perform duplication, and is used for at least one transmission resource, which is used when transmitting data and/or duplicating data, configured for the UE.

The duplication is transmission of duplicated data containing at least two transmission resources. The embodiments are particularly suitable for transmission of duplicated data containing three or more transmission resources.

The duplication configuration includes an index of at least one transmission resource used for transmitting data and/or duplicating data.

The at least one transmission resource used for transmitting and/or duplicating data include at least one of the following: a radio link control (RLC) entity used for transmitting data and/or duplicating data, a logical channel used for transmitting data and/or duplicating data, a CG used for transmitting data and/or duplicating data, and a carrier used for transmitting data and/or duplicating data.

In the following, the present embodiments are described in a plurality of processing manners.

Processing Manner 1.

The processing manner is a duplication solution mainly determined by a network device. The network notifies, through DCI or MAC CE or RRC, the index of the at least one transmission resource used in the duplication (for example, which may include at least one of the following: a RLC entity, a logical channel index, a carrier index, and a CG index). Accordingly, the UE determines, based on the information, whether to perform duplication, and CG resource used on the corresponding carrier when transmitting data and/or duplicating data.

The first communication unit 41 of the network device is configured to transmit the duplication configuration to the UE.

The duplication configuration at least includes an index of at least one transmission resource used for duplication.

In addition, the duplication configuration further includes at least one of the following: an initial state of a duplication mode, a number of pieces of duplicated data corresponding to the initial state, a primary cell of a cell group corresponding to a bearer for performing duplication configured for the UE, and a primary cell corresponding to the bearer for performing duplication configured for the UE.

The initial state of the duplication may include activating the duplication or deactivating the duplication. Here, the duplication may be understood as a function of copying or a function of copying and transmission. The number of pieces of duplicated data corresponding to the initial state may be set according to practical situation. For example, the number of pieces of duplicated data corresponding to the initial state may be two or more, or one.

Further, the duplication configuration further includes at least one of the following.

A primary leg or a logical channel when a duplication mode of the bearer for performing duplication configured for the UE is in an activation state. The primary leg or logical channel may be used to transmit PDCP control PDU, and/or a PDCP data PDU.

A default leg, a primary leg or a logical channel when the duplication mode of the bearer for performing duplication configured for the UE is in a deactivation state. The default leg, the primary leg or the logical channel may be represented by a default index, or a primary leg index or a logical channel index, and the default leg, the primary leg or the logical channel may be used to transmit PDCP control PDU and/or PDCP data PDU.

A default carrier when the duplication mode of the bearer for performing duplication configured for the UE is in the deactivation state.

A Configured Grant (CG) when the duplication mode of the bearer for performing duplication configured for the UE is in the deactivation state.

If the network needs to modify a state of duplication, the first communication unit 41 is configured to transmits the first indication information to the UE through one of the following: RRC, DCI or MAC CE.

The first indication information carries at least one of the following information: a bearer index used for transmitting data and/or duplicating data after modifying the duplication state, an RLC entity index used for transmitting data and/or duplicating data after modifying the duplication state, a logical channel index used for transmitting data and/or duplicating data after modifying the duplication state, a cell group index used for transmitting data and/or duplicating data after modifying the duplication state, a carrier index used for transmitting data and/or duplicating data after modifying the duplication state, and a CG index used for transmitting data and/or duplicating data after modifying the duplication state.

Both the carrier index and the CG index used for transmitting data and/or the duplicating data after modifying the duplication state in the first indication information may form corresponding lists.

At least one of the above CG index, the carrier index, the RLC entity index, the logical channel index, and the cell group index may be a list, for example, may be a carrier index list. Alternatively, the CG index, carrier index, RLC entity index, logical channel index, cell group index may also be represented in the form of a combination of bitmap indexes, for example, a carrier is identified by a bitmap, or a CG is identified by a bitmap, or the like.

In addition, the operation that the network device determines that the state of the duplication is needed to be modified may be as follows. A first processing unit 42 of the network device is configured to determine whether the state of the duplication is needed to be modified according to factors such as a current data transmission amount, a packet loss rate, channel quality, and a packet type to be transmitted. For example, if the duplication is currently in the deactivation state and a high packet loss rate or a poor channel quality is detected, the duplication may be controlled to switch from the deactivation state to the activation state, thereby ensuring the quality of the data transmission. On the contrary, if the duplication is currently in the activation state and a current good channel quality is detected, the duplication may be controlled to switch to the deactivation state. Since one transmission resource is able to guarantee the quality of the data transmission, the effective utilization rate of the resource is improved. Of course, other factors may be provided to determine whether the state of the duplication is needed to be modified, but the present embodiments will not be exhaustive.

Specifically, an example of an MAC CE is shown in FIG. 6.

A new LCID is introduced to identify the activation/deactivation of duplication in at least two leg scenarios.

A new MAC CE format is introduced. The format may include at least one of the following information: bearer index, RLC entity index/logical channel index, cell group index, carrier index, and CG index. For example, the RLC entity index/logical channel index is an implicit RLC entity index/logical channel index, which may occupy, for example, 4 bit, and the RLC entities configured for this bearer are sorted in ascending order of index. As shown in the top left of FIG. 6, a DRB bearer may be considered to contain a logical channel index. When the index is 0001, the duplication of logical channel may be considered to be activated, and if the index is 0000, the duplication of logical channel may be considered to be in deactivated. In the lower left of FIG. 6, it can be seen that the DRB bearer corresponds to two logical channels and two logical channels are arranged in ascending order in MAC CE. The index 0001 represents that the duplication of the first logical channel is activated, and the index 0010 represents that the duplication of the second logical channel is in activated.

In the above descriptions, a manner for the indicating the activation based on the format of new MAC CE is mainly described. Deactivation may be indicated by setting the index corresponding to the RLC entity or logical channel to be 0. For example, one certain bit is 0 indicates that the corresponding logical channel is a deactivated logical channel. When the value is 0000, it represents that all corresponding logical channels or duplication is deactivated. Alternatively, when only one bit is 1, such as 0001, it represents that only the corresponding logical channel is used for transmitting data or duplication is deactivated. Alternatively, the indication of deactivation or activation may be performed by adopting a format of an existing MAC CE. For example, as shown in FIG. 7, Di indicates that the i-th DRB PDCP duplication is activated or deactivated. For example, when the corresponding indication is that Di is set to 1, activation (or deactivation) may be indicated, and deactivation (or activation) may be indicated when Di is set to 0. The DRB is arranged in ascending order, and is a DRB configured on this MAC entity by a configured logical channel.

It should be noted that in the MAC CE, it may carry a carrier index and/or CG index, or a carrier index list and/or a CG index list, which will not be exemplified here.

Another example of the MAC CE format is shown in FIG. 8, a plurality of CGs are indicated in MAC CE. As shown in the figure, three CGs are contained, and the index of each CG is indicated in MAC CE, respectively. Regarding the activation or deactivation for different CGs, it may be same with the above indication manner for the RLC entity/logical channel, which is an explicit CG index (e.g., 0001 represents the use of CG index1, 0010 represents the use of CG index2, and 0011 represents the use of CG index3). Referring with FIG. 8, if CG index1 and CG index2 are activated, the bit field of the first CG index is 0001, and the bit field of the second CG index is written as 0010. The bit field of the third CG index is 0000. Alternatively, if the third CG is not activated, only the first two CG indexes may be contained in FIG. 8 index.

Alternatively, indexes of CG combination may be adopted (e.g. 0001 represents the use of CG idnex1, 0010 represents the use of CG index2 and 0011 represents the uses of CG index2 and CG index 1).

In addition, for the carrier index, the same manner as the RLC entity may be adopted. For example, an explicit carrier index (e.g., 0001 represents the use of the carrier index1, 0010 represents the use of the carrier index2, and 0011 represents the use of the carrier index3) or index of CG combination (e.g., 0001 represents the use of the carrier idnex1, 0010 represents the use of the carrier index2, and 0011 represents the use of the carrier index2 and carrier index1) may be adopted.

It should be noted that the length of MAC CE may be variable or fixed. It should be noted that the MAC CE mentioned in the present processing manner may be applied to each processing manner in the present embodiments, and details are not described below.

A second communication unit 51 of the UE is configured to receive the first indication information transmitted by the network device through one of RRC, DCI or MAC CE. A second processing unit 52 of the UE is configured to determine, based on the first indication information, whether to perform the duplication, and the CG resource used on the corresponding carrier when transmitting the data and/or duplicating data.

The specific content of the first indication information is as described above, and details are not described herein.

Specifically, the second processing unit 52 of the UE is configured to perform the at least one of the following operations.

A bearer, such as a DRB, on which the modification of duplication is performed, is determined based on the bearer index used for transmitting data and/or duplicating data after modifying the duplication state in the first indication information.

The UE determines, based on the RLC entity index used for transmitting data and/or duplicating data after modifying the duplication state and/or the cell group index used for transmitting data and/or duplicating data after modifying the duplication state, the leg used for transmitting data and/or duplicating data, such as which RLC entity.

The UE determines, based on the CG index and/or carrier index used for transmitting data and/or duplicating data after modifying the duplication state, the UL grant used for transmitting data and/or duplicating data, such as the configured CG and/or which carrier is used for data transmission. If CG index1 is indicated, it represents that the CG resource is activated or is used for transmitting the bearer.

The second communication unit 51 is configured to perform data transmission or data duplication according to the network instruction.

Processing Manner 2.

The network notifies the number of copies of the duplication through the DCI or the MAC CE, and the UE determines whether to perform the duplication according to the acquired number of copies, and selects the transmission resource carrying the duplication data.

The first communication unit 41 of the network device is configured to transmit a duplication configuration for the UE. Specifically, the processing manner is same as that described above, and details are not described herein.

If the duplication state is needed to be modified, the first communication unit 41 of the network device is configured to transmit the second indication information to the UE through one of RRC, DCI or MAC CE. The second indication information is used for indicating a bearer that the UE needs to modify and a number of pieces of duplicated data corresponding to the bearer.

Specifically, an example of an MAC CE is shown in FIG. 10.

A new LCID is introduced to identify the activation/deactivation of duplication in at least two leg scenarios.

A new MAC CE format is introduced. The format may include at least one of the following information: bearer index (DRB Index in the figure) and the number of copies. For example, copies occupy 4 bit. For example, 00 represents 1 copy, 01 represents 2 copies, 10 represents 3 copies, and 11 represents 4 copies.

The second communication unit 51 of the UE is configured to receive the second indication information transmitted by the network device through one of RRC, DCI or MAC CE. Then, the UE determines, based on the bearer index in the second indication information, a corresponding bearer for performing data transmission or duplication. The UE determines, based on the number of duplications in the second indication information, whether to perform duplication or the number of RLC entities or legs for performing duplication. The UE selects, based on at least one of a first parameter and the number of the RLC entities or legs, the RLC entities or legs for performing duplication.

After determining the number of copies or the number of legs, the UE determines which leg is selected. That is, the UE determines the leg that performs the duplication. There may be two processing manners. In one manner, after determining the number N of copies or the number N of legs (leg) (N being an integer), the UE randomly select N legs from a plurality of legs as the legs for performing the duplication.

In another manner, after determining the number of copies or the number of legs, the UE may determine which leg is selected based on the first parameter. That is, the UE determines the leg for performing the duplication. Specifically, the leg for performing the duplication may be selected from a plurality of legs according to the first parameter, or the first parameter and its corresponding comparison threshold.

The first parameter is at least one of the following: channel quality, the number of NACKs in HARQ feedback, ARQ feedback, average latency, QoS parameter and reliability.

The operation of selecting according to the first parameter may be selecting based on the first parameter and its corresponding comparison threshold. The first parameter and/or the comparison threshold may be indicated to the UE by the network, or may be pre-configured by the UE.

The second communication unit 51 of the UE is configured to feed back transmission resource selection information through MAC CE or physical layer signaling. Further, data transmission or data duplication is performed according to the above descriptions.

The transmission resource selection information includes at least one of the following: a carrier index selected by the UE, an RLC entity index selected by the UE, a logical channel index selected by the UE, a cell group index selected by the UE, and a CG index selected by the UE. Similarly, the CG index may be one or more CG indexes. That is, the CG index may be a CG list. Similarly, the carrier index may be one or more carrier indexes. That is, the carrier index may be a carrier index list.

In another situation, when performing the above first operation or the second operation, or before performing the third operation, the following operation may be further included. The first communication unit transmits third indication information to the UE. The third indication information includes index of at least one transmission resource that can be used by the bearer that the duplication state needs to be modified, and specifically may be a CG index.

Processing Manner 3.

The UE determines whether to modify the duplication manner, and notifies the corresponding information to the network through the MAC CE or the physical layer information. The information may include at least one of the following: bearer index, RLC entity index/logical channel index, cell group index, carrier index, CG index.

The network device transmits the duplication configuration for the UE through the first communication unit 41. Specifically, the processing manner is same with the manner described above, and details are not described herein.

In addition, the network device may also configure, through RRC, a decision mechanism for the UE to perform the duplication modification, such as a threshold, a measurement object, and the like.

The second communication unit 51 of the UE is configured to receive configuration information of the network. The data transmission is performed according to the initial state of the duplication. Alternatively, when the initial transmission state is not indicated, the UE may determine the initial transmission state by itself, or determine the initial transmission state according to the mechanism (information) configured by network, or determine the initial transmission state according to a predefined rule. The transmission is performed according to the initial transmission state.

When the UE determines that the duplication modification condition is currently satisfied, for example, when the state of the duplication is modified from an activation state to a deactivation state, or when the leg/RLC entity that performs the transmission of duplicated data is modified, the UE modifies the resources used for the duplication, such as the number of RLC entities, the specific RLC entity, the carrier, and one or more CGs.

The manner in which the UE determines that the duplication modification condition is satisfied is similar to the manner in which the network device determines the modification condition in the processing manner 1, but is used in the UE side for processing. Therefore, details are not described herein.

The second communication unit 51 of the UE is configured to transmit the notification information to the network device. The notification information includes at least one transmission resource used for transmitting data and/or duplicating data after the UE determines to modify a duplication state.

The at least one transmission resource used for transmitting data or duplicating data after modifying the duplication state includes at least one of the following: a bearer index used for performing data transmission or duplication after modifying the duplication state, an RLC entity index used for performing data transmission or duplication after modifying the duplication state, a cell group index used for performing data transmission or duplication after modifying the duplication state, a carrier index used for performing data transmission or duplication after modifying the duplication state, and a CG index used for performing data transmission or duplication after modifying the duplication state.

Specifically, the information may be notified by the UE to the network device through UCI or MAC CE or RRC.

Specifically, the MAC CE for the UE to report the notification information may be as shown in FIG. 12.

A new LCID is introduced to identify the activation/deactivation of duplication in at least two leg scenarios.

A new MAC CE format is introduced. The format may include at least one of the following information: bearer index, RLC entity index, cell group index, carrier index, and CG index.

The first communication unit 41 of the network device is configured to receive the notification information. The first processing unit is configured to determine, based on the notification information, whether to perform the modification of the duplication state and the at least one transmission resource used for transmitting data and/or duplicating data, such as which RLC entity, which carrier, which CG, and the like.

Therefore, by using the above solutions, when are two or more transmission resources exist, transmission resources for duplication may be directly configured for the UE, thereby reducing overhead of idle mode signaling, reducing data transmission latency, ensuring system processing efficiency and increasing a flexible control manner for data duplication.

Figure 15:
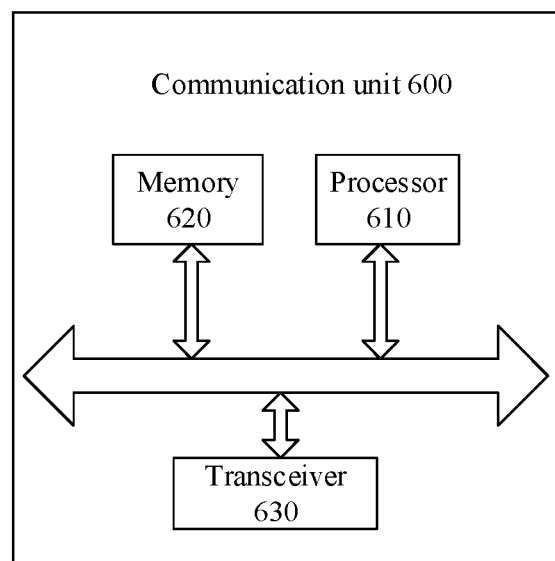
FIG. 15 is a schematic diagram of a composition structure of a communication device according to embodiments of the present disclosure.

FIG. 15 is a schematic block diagram of a communication device 600 according to embodiments of the present invention. The communication device in the embodiment may be specifically a network device or a terminal device in the foregoing embodiments. The communication device 600 shown in FIG. 15 includes a processor 610 that can call and run computer programs from a memory to implement the method in embodiments of the present invention.

Alternatively, as shown in FIG. 15, the communication device 600 may also include a memory 620. A processor 610 may call and run computer programs from the memory 620 to implement the method in the embodiments of the present disclosure.

The memory 620 may be a separate device independent of the processor 610, or may be integrated in the processor 610.

Alternatively, as shown in FIG. 15, the communication device 600 may also include a transceiver 630 that may be controlled by the processor 610 to communicate with other devices. Specifically, the transceiver 630 may transmit information or data to other devices or receive information or data transmitted by other devices.

The transceiver 630 may include a transmitter and a receiver. The transceiver 630 may further include antennas, and the number of antennas may be one or more.

Alternatively, the communication device 600 may be specifically a network device of the embodiments of the present disclosure. The communication device 600 may implement corresponding flows implemented by the network device in the respective methods according to the embodiments of the present disclosure. For brevity, details are not described herein.

Alternatively, the communication device 600 may be specifically a terminal device or a network device of the embodiments of the present disclosure, and the communication device 600 may implement corresponding flows implemented by the mobile terminal/terminal device in the respective methods according to the embodiments of the present disclosure. For brevity, details are not described herein.

Figure 16:
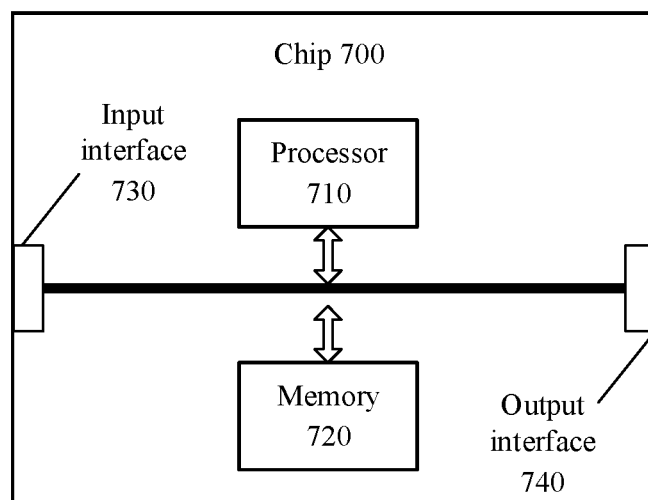
FIG. 16 is a schematic block diagram of a chip according to embodiments of the present disclosure.

FIG. 16 is a schematic block diagram of a chip according to embodiments of the present disclosure. The chip 700 shown in FIG. 16 includes a processor 710 that may call and run computer programs from memory to implement the method in the embodiments of the present disclosure.

Alternatively, as shown in FIG. 16, the chip 700 may also include a memory 720. The processor 710 may call and run computer programs from the memory 720 to implement the method in the embodiments of the present disclosure.

The memory 720 may be a separate device independent of the processor 710, or may be integrated in the processor 710.

Alternatively, the chip 700 may also include an input interface 730. The processor 710 may control the input interface 730 to communicate with other devices or chips. Specifically, the input interface 730 may acquire information or data transmitted by other devices or chips.

Alternatively, the chip 700 may also include an output interface 740. The processor 710 may control the output interface 740 to communicate with other devices or chips. Specifically, the output interface 740 may output information or data to other devices or chips.

Alternatively, the chip may be applied to the network device in the embodiments of the present disclosure, and the chip may implement corresponding flows implemented by the terminal device in the respective methods according to the embodiments of the present disclosure. For brevity, details are not described herein.

It should be understood that the chip mentioned in the embodiments of the present disclosure may also be referred to as a system-level chip, a system chip, a chip system or a system-on-chip chip, or the like.

It should be understood that the processor of the embodiments of the present disclosure may be an integrated circuit chip having signal processing capabilities. In implementation, the operations of the above method embodiments may be accomplished by integrated logic circuits of hardware in the processor or instructions in the form of software. The processors described above may be general purpose processors, Digital Signal Processor (DSP), Application Specific Integrated Circuit (ASIC), Field Programmable Gate Array (FPGA) or other programmable logic devices, discrete gate or transistor logic devices, discrete hardware components. The methods, steps, and logical block diagrams disclosed in the embodiments of the present disclosure may be implemented or performed. The general purpose processor may be a microprocessor or the processor may be any conventional processor or the like. The operations of the method disclosed in connection with the embodiments of the present disclosure may be directly implemented by a hardware decoding processor or by a combination of hardware and software modules in the decoding processor. The software module may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the operations of the above method in conjunction with its hardware.

It should be understood that the memory in embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It should be understood that the above memory is exemplary, but not limited, and that the memory in the embodiments of the present disclosure may be, for example, static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and Direct Rambus RAM (DR RAM), among others. That is, the memory in the embodiments of the present disclosure is intended to include, but is not limited to, these and any other suitable types of memory.

Figure 17:
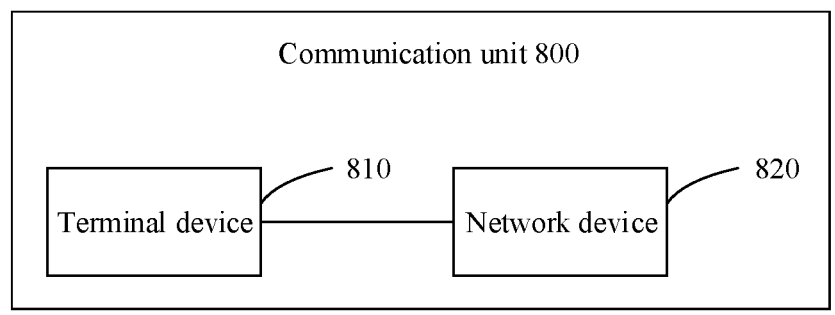
FIG. 17 is a second schematic diagram of a communication system architecture according to embodiments of the present disclosure.

FIG. 17 is a schematic block diagram of a communication system 800 according to embodiments of the present disclosure. As shown in FIG. 17, the communication system 800 includes a terminal device 810 and a network device 820.

The terminal device 810 may be used to implement the corresponding functions implemented by the UE in the method described above, and the network device 820 may be used to implement the corresponding functions implemented by the network device in the method described above. For brevity, details are not described herein.

The embodiments of the present disclosure further provide a computer readable storage medium for storing computer programs.

Alternatively, the computer readable storage medium may be applied to the network device or the terminal device in the embodiments of the present disclosure, and the computer programs causes the computer to execute the corresponding flows implemented by the network device in the respective methods in the embodiments of the present disclosure, and details are not described herein for brevity.

The embodiments of the present disclosure also provide a computer program product including computer program instructions.

Alternatively, the computer program product may be applied to the network device or the terminal device in the embodiments of the present disclosure, and the computer program instructions cause the computer to execute the corresponding flows implemented by the network device in the respective methods of the embodiments of the present disclosure. For brevity, details are not described herein.

The embodiments of the invention also provide a computer program.

Alternatively, the computer program may be applied to a network device or a terminal device according to the embodiments of the present disclosure. When the computer program is run on a computer, the computer is enabled to execute a corresponding flow implemented by the network device in the respective methods of the embodiments of the present disclosure. For brevity, details are not described herein.

Those of ordinary skill in the art should recognize that the elements and algorithm operations of the examples described in connection with the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It should be understood to those skilled in the art that for the convenience and brevity of the description, reference may be made to the corresponding processes in the above method embodiments for the specific working procedures of the above-described systems, apparatuses and units, and details will not be described herein.

In the several embodiments provided herein, it should be understood that the disclosed systems, apparatus, and methods may be implemented in other ways. For example, the device embodiments described above are merely illustrative, for example, the partitioning of the unit is only one logical function partitioning, and may be implemented in another partitioning manner, for example, a plurality of units or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be selected according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer readable storage medium. Based on such an understanding, the technical solutions of the present disclosure may be embodied in the form of a software product, which is stored in a storage medium and includes instructions for causing a computer device (which may be a personal computer, a server, a network device, or the like) to perform all or some of the steps of the methods described in the various embodiments of the present disclosure. The storage medium includes a USB flash drive, a removable hard disk, a Read-Only Memory (Read-Only Memory) ROM, a Random Access Memory (Random Access Memory), a magnetic disk, or an optical disk.

The above description is merely illustrative of the specific embodiments of the present disclosure, but the scope of protection of the present disclosure is not limited thereto. Variations or substitutions may readily occur to those skilled in the art within the technical scope disclosed in the present disclosure, and are intended to be included within the scope of protection of the present application. Accordingly, the scope of protection of the present disclosure shall be as described with reference to the scope of protection of the claims.

The invention claimed is:

1. A method for selecting transmission resource, applied to a network device, comprising:
    transmitting a duplication configuration to a user equipment (UE),
    wherein the duplication configuration is used for determining, by the UE, whether to perform duplication, and is used for at least one transmission resource, which is used when transmitting data, configured for the UE,
    wherein transmitting the duplication configuration to the UE comprises:
    transmitting the duplication configuration to the UE through radio resource control (RRC),
    wherein the duplication configuration comprises a number of pieces of duplicated data corresponding to an initial state of a duplication mode.

2. The method of claim 1, wherein the duplication is transmission of duplicated data containing at least two transmission resources.

3. The method of claim 1, wherein the duplication configuration comprises an index of at least one transmission resource used for at least one of transmitting data or duplicating data.

4. The method of claim 3, wherein the duplication configuration further comprises:
    a logical channel when the duplication mode of the bearer for performing duplication configured for the UE is in a deactivation state.

5. A method for selecting transmission resource, applied to a user equipment (UE), comprising:
    receiving a duplication configuration transmitted by a network device,
    wherein the duplication configuration is used for determining, by the UE, whether to perform duplication, and is used for at least one transmission resource, which is used when transmitting data, configured for the UE,
    wherein receiving the duplication configuration transmitted by the network device comprises:
    receiving the duplication configuration transmitted by the network device through radio resource control (RRC),
    wherein the duplication configuration comprises a number of pieces of duplicated data corresponding to an initial state of a duplication mode.

6. The method of claim 5, wherein the duplication is a data duplication containing at least two transmission resources.

7. The method of claim 5, wherein the duplication configuration comprises an index of at least one transmission resource used for at least one of transmitting data or duplicating data.

8. The method of claim 7, wherein the duplication configuration further comprises:
    a logical channel when the duplication mode of the bearer for performing duplication configured for the UE is in a deactivation state.

9. A user equipment (UE) comprising a transceiver, a processor and a memory for storing computer programs capable of running on the processor,
    wherein the memory is configured to store computer programs, and the processor is configured to call and run the computer programs stored in the memory to:
    control the transceiver to receive a duplication configuration transmitted by a network device,
    wherein the duplication configuration is used for determining, by the UE, whether to perform duplication, and is used for at least one transmission resource, which is used when transmitting data, configured for the UE,
    wherein the processor is specifically configured to call and run the computer programs stored in the memory to: control the transceiver to receive the duplication configuration transmitted by the network device through radio resource control (RRC),
    wherein the duplication configuration comprises a number of pieces of duplicated data corresponding to an initial state of a duplication mode.

10. The UE of claim 9, wherein the duplication is a data duplication containing at least two transmission resources.

11. The UE of claim 9, wherein the duplication configuration comprises an index of at least one transmission resource used for at least one of transmitting data or duplicating data.

12. The UE of claim 11, wherein the duplication configuration further comprises:
    a logical channel when the duplication mode of the bearer for performing duplication configured for the UE is in a deactivation state.

* * * * *